United States Patent [19]

Tanaka et al.

[11] Patent Number: 4,594,694
[45] Date of Patent: Jun. 10, 1986

[54] SOUND SOURCE SEARCHING DEVICE

[75] Inventors: Katsuyuki Tanaka, Okazaki; Yasuhiro Kimura, Anjo; Masanori Kato, Toyoake; Satosi Kuwakado, Nukata, all of Japan

[73] Assignee: Nippon Soken, Inc., Nishio, Japan

[21] Appl. No.: 528,962

[22] Filed: Sep. 2, 1983

[30] Foreign Application Priority Data

Sep. 6, 1982 [JP] Japan .............................. 57-155032

[51] Int. Cl.⁴ .............................................. G01S 3/80
[52] U.S. Cl. .................................................. 367/120
[58] Field of Search ........................ 367/120, 124, 125

[56] References Cited

U.S. PATENT DOCUMENTS 3,728,619 4/1973 Harrold et al. ..................... 367/120

Primary Examiner—Richard A. Farley
Attorney, Agent, or Firm—Cushman, Darby & Cushman

[57] ABSTRACT

A sound source searching device for searching an objective sound source out of a plurality of sound sources, is disclosed. The device comprises an intensity probe provided with one pair of microphones, pulse motors for rotating the probe on the horizontal and vertical planes, a computer for calculating acoustic intensity corresponding to the frequency of the objective sound source from the sound pressure signal generated by the intensity probe, an interface device provided with pulse motor driving circuits for driving the pulse motors in accordance with the instructions of the computer by predetermined angles and an indicator for indicating the direction in which the acoustic intensity is the minimum on the horizontal and the vertical planes, as the direction of the objective sound source.

7 Claims, 4 Drawing Figures

SOUND SOURCE SEARCHING DEVICE

BACKGROUND OF THE INVENTION

The present invention relates to a sound source searching device for searching an objective sound source out of a plurality of sound sources, and particularly to a sound source searching device employing an intensity probe.

In order to reduce noise produced in a large number of sound source of an internal combustion engine or the like, it is effective to search one sound source of which the sound pressure level is the maximum and prevent the sound source from producing noise.

For searching the above described sound source precisely, the detector having a sharp directivity against sound must be employed. Recently, the intensity probe has been noted as the above described detector.

The intensity probe (hereinafter, will be called "probe") is provided with two omnidirectional microphones 11a, 11b.

By making a frequency analysis of the sound pressure signals obtained by the microphones 11a, 11b, combining spectrums of the above sound pressure signals into a cross spectrum and calculating acoustic intensity (hereinafter, will be called "intensity") from the imaginary part of the cross spectrum, the directional characteristics as shown in FIG. 1 is obtained.

Namely, when the sound source approaches the plane including $O_I$, $O_c$, $O_{II}$, the intensity rapidly decreases.

In order to search an objective sound source, at first, by moving the probe on the first plane, the first direction in which the absolute value of intensity is the minimum is searched, then by moving the probe on the second plane including the above horizontal direction, which is perpendicular to the first plane, the second direction in which the absolute value of intensity is the minimum is searched, as the direction of sound source.

Conventionally, the above search has been performed by controlling the probe by hand, so it is difficult to search the sound source precisely even by use of great effort and a long period of time.

SUMMARY OF THE INVENTION

The sound source searching device of the present invention comprises an intensity probe provided with one pair of microphones, a probe driving means for supporting the above intensity probe and rotating by a predetermined angle the above intensity probe stepwise in a first plane and in a second plane which perpendicularly intersects the first plane about the intermediate point of the above microphones. A frequency analyzing means analyzes the frequency of the sound pressure signals fed from the intensity probe at every rotating position and forming a cross spectrum of sound pressure signals. A processing means calculates acoustic intensity corresponding to the frequency of the objective sound source from the cross spectrum. A direction indicating means indicates the direction in which the absolute value of acoustic intensity is the minimum (that is, the direction in which the sign of the acoustic intensity is inverted) in the second plane including the direction in which the absolute value of acoustic intensity is the minimum (that is the direction in which the sign of the acoustic intensity is inverted) in the first plane, as the direction in which the objective sound source is positioned.

According to the present invention, the intensity probe is rotated stepwise by a predetermined angle on the first and second planes by means of the probe driving means. The processing means calculates acoustic intensity corresponding to the frequency of the sound source at every rotating position. Then, the direction indicating means indicates the direction in which the absolute value of acoustic intensity is the minimum on both of the first and second planes as the direction of the objective sound source.

One object of the present invention is to provide a sound source searching device by which an objective sound source can be precisely searched in a short period of time without wasting great effort.

Another object of the present invention is to provide a sound source searching device which automatically searches an objective sound source with precision and indicates the direction of the objective sound source.

DETAILED DESCRIPTION OF THE EMBODIMENTS

Hereinafter, the present invention will be explained in accordance with the embodiments thereof with reference to the accompanying drawings.

Figure 2:
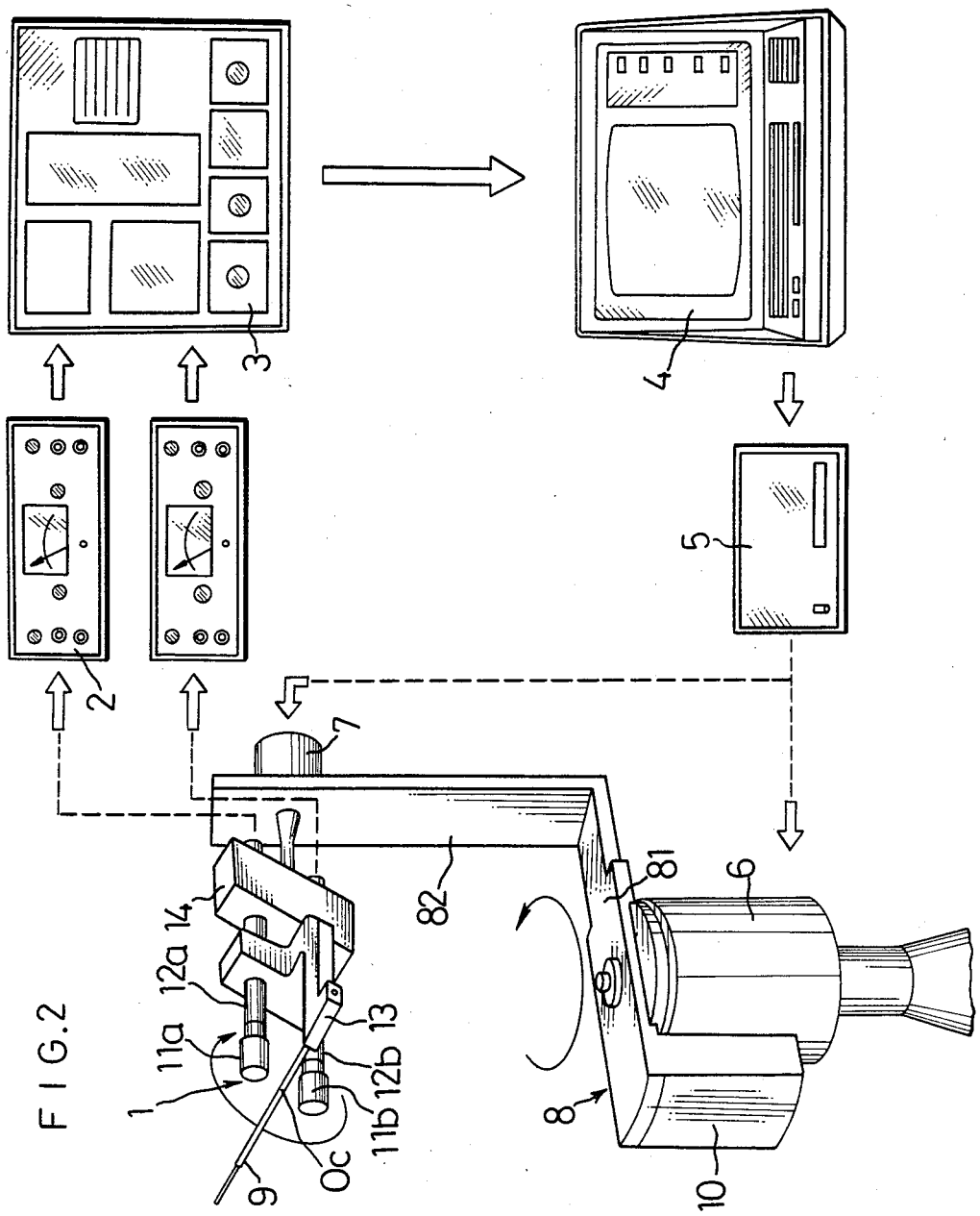
FIG. 2 is a view illustrating the sound source searching device of the present invention.

FIG. 2 shows the composition of the sound source searching device of the present invention.

An intensity probe 1 is provided with two microphones 11a, 11b. The sound pressure signal generated by the intensity probe is amplified by an amplifier 2. The sound pressure signal is analyzed by the frequency thereof, then a cross spectrum is obtained by a fast Fourier transducer 3. Then, the acoustic intensity corresponding to the frequency of the objective sound source is calculated from the imaginary number of the cross spectrum by a computer 4.

The reference numeral 5 designates an interface device provided with pulse motor driving circuits which rotate the probe 1 in the horizontal and vertical directions in accordance with the instructions of the computer 4, the reference numerals 6, 7 designate pulse motors for rotating the probe 1 on the horizontal plane and vertical plane, respectively, and the reference numeral 9 designates an indicator for indicating the direction of the objective sound source.

The microphones 11a, 11b of the intensity probe 1 are mounted on the top ends of cylindrical housings 12a, 12b, respectively, Within the housings 12a, 12b, preamplifier circuits for amplifying feeble sound pressure signals fed from the microphones 11a, 11b, are accomodated, respectively. The housings 12a, 12b are retained by microphone holders 13, 14 so as to be spaced by a predetermined interval. The indicator 9 is mounted on the microphone holder 13 so as to pass through the middle point Oc of the microphones 11a, 11b and extend in the direction perpendicular to the line connecting the microphones 11a, 11b.

A supporting stand 8 is formed by bending a strip-shaped plate at right angles. A horizontal portion 81 is supported by the pulse motor 6 so as to rotate on the horizontal plane. A vertical portion 82 is provided with the pulse motor 7. The pulse motor 7 supports the microphone holders 13, 14 of the probe 1 so as to rotate on the vertical plane. The middle point Oc is positioned on the intersection of the extensions of the rotating shafts of the pulse motors 6, 7. Thus, the microphones 11a, 11b are rotated by the pulse motors 6, 7 on the horizontal plane and the vertical plane about the middle point Oc. A weight 10 is installed in the horizontal portion 81 of the supporting stand 8 for balancing the horizontal portion 81 with the intensity probe 1 and the pulse motor 7.

Figure 3:
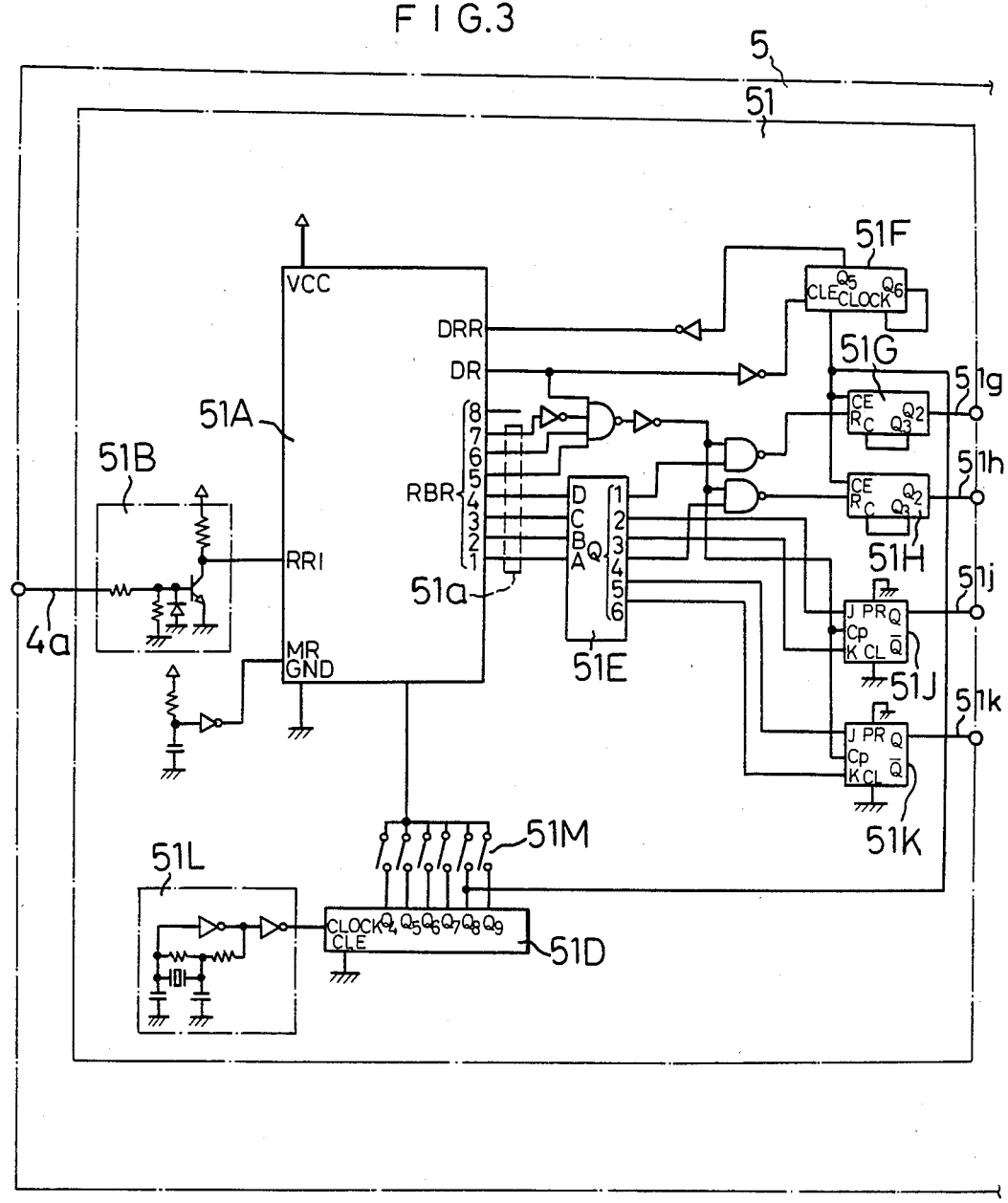
FIGS. 3 and 4 are views illustrating an interface circuit of pulse motors.
Figure 4:
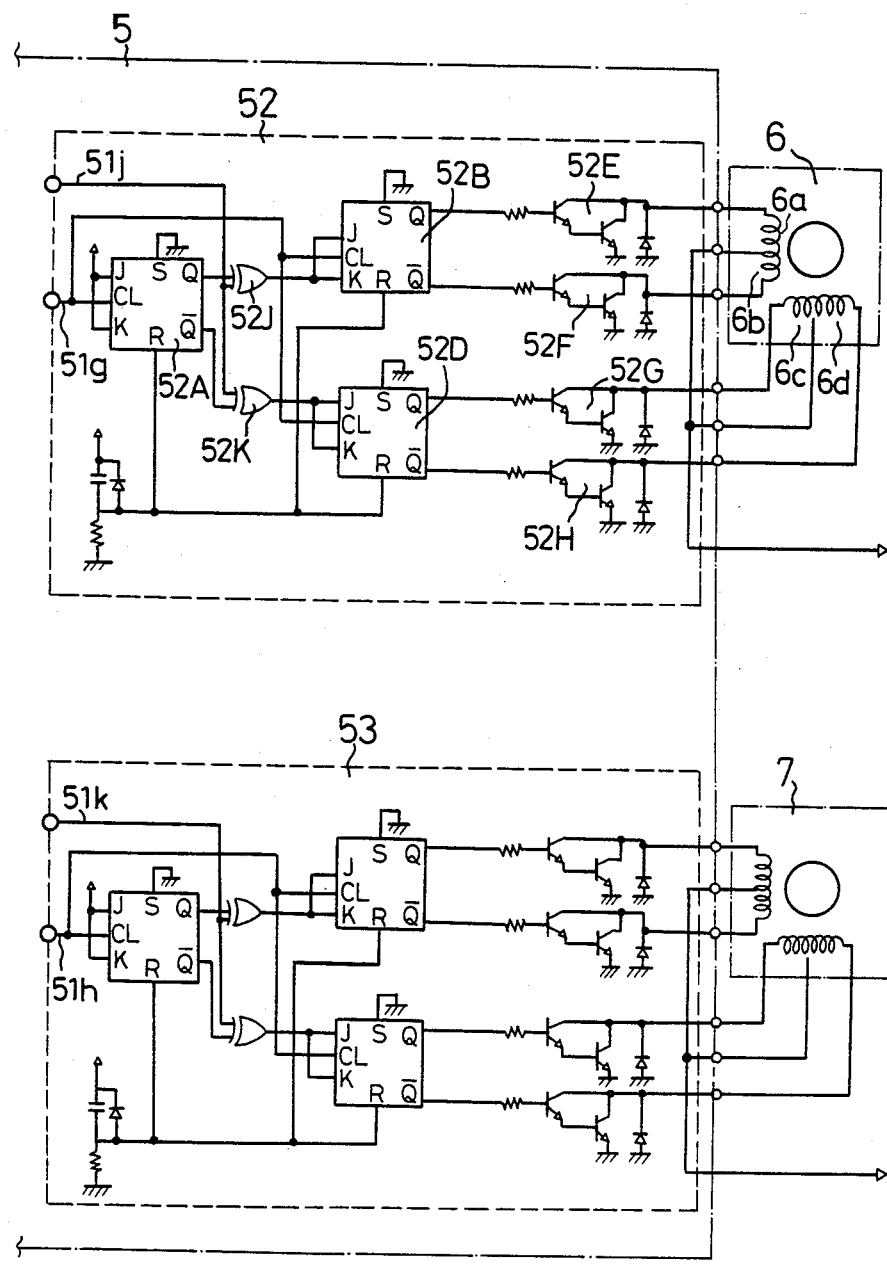

FIGS. 3 and 4 illustrate an interface circuit 5 of the pulse motors 6, 7. The reference numeral 51 designates a signal decoder circuit which is composed of a series-parallel convertor (VART) 51A, a waveform shaping circuit 51B, binary counters 51D, 51F, 51G, 51H, J-K flip-flops 51J, 51K, a decoder 51E, an oscillation circuit 51L and a baud rate selecting switch 51M. The reference numerals 52, 53 designate driving circuits for driving the pulse motors 6, 7, respectively.

The driving circuit 52 comprises J-K flip-flops 52A, 52B, 52D, drivers 52E, 52F, 52G, 52H, each of which is composed of transistors forming a Darlington circuit, and EXCLUSIVE OR gates 52J, 52K.

As the series-parallel convertor 51A, IM 6402 made by Intercil Co., Ltd. can be used, and as the other digital IC, CD 4000 series made by RCA Co., Ltd. can be used.

The pulse motor rotation directing signal 4a which is fed in series by the computer 4 at a predetermined baud rate, is shaped by the waveform shaping circuit 51B, and is converted into a parallel signal of 8 bits by the series-parallel convertor 51A, which appears at the output terminals RBR. The decoder 51E generates a output signal of 1 level at the output terminal Q, which corresponds to the binary lower four bits of the output signal 51a of the convertor 51A. Upon receiving the output signal from the decoder 51E, the J-K flip flops 51J, 51K are set to determine the rotating direction of the pulse motors 6, 7. And the binary counters 51G, 51H which operate as the monostable multivibrators, generate pulse signals 51g, 51h which determine the rotating step of the pulse motors 6, 7. When the output signals 51j, 51k of the flip-flops 51J, 51K are 1 level, the pulse motors 6, 7 rotate clockwise while when the output signals 51j, 51k of the flip-flops 51J, 51K are 0⁻ level, the pulse motors 6, 7 rotate counter-clockwise.

The output signal 51j of the flip-flop 51J and the output signal of the flip-flop 52A are fed to the EXCLUSIVE OR gates 52J, 52K. The EXCLUSIVE OR gates 52J, 52K feed output signals which determine the order of inversion of the output signals of the flip-flops 52B, 52D. As a result, the coils 6a, 6b and the coils 6c, 6d of the pulse motor 6 are alternately excited through the drivers 52E, 52F, 52G, 52H. The pulse motor 6 rotates in the direction determined by the computer 4 by steps determined by the computer 4.

The operation of the driving circuit 53 which receives the output signals 51k, 51h of the flip flop 51K and the counter 51H is similar to that of the driving circuit 52.

For example, in order to rotate the pulse motor 6 clockwise by three steps, character signal 2111 of ASCII Code is successively fed to the decoder circuit 51 from the computer 4 as the pulse motor rotating signal 4a. At first, the ASCII Code 0110010 corresponding to the character 2 is fed to the decoder circuit 51. At the terminals RBR7 to RBR 1 of the series-parallel convertor 51A, parallel signal 51a of 7 bits having a signal level of 0110010 appears.

At the terminal $Q_2$ of the decoder 51E, the output signal of 1 level which corresponds to the lower 4 bits 0010 of the signal 51a, appears. When the data ready signal is fed from the terminal DR of the convertor 51A, the flip-flop 51J to which the output signal of 1 level is fed from the terminal $Q_2$, feeds the output signal 51j of 1 level to the driving circuit 52.

Next, the character 1 is fed to the decoder circuit 51. Parallel signal 51a of 0110001 level appears at the output terminal RBR7 to RBR1 successively. As a result, the decoder 51E generates output signal of 1 level at the output terminal $Q_1$. When the data ready signal is fed from the terminal DR of the convertor 51A to the counter 51G to which the 1 level signal is fed from the decoder 51E, the counter 51G feeds pulse signal 51g having a predetermined pulse width to the driving circuit 52.

Upon receiving this pulse signal, the output signal of the flip-flop 52A is inverted while the output signal of the flip-flop 52B is inverted to excite the coil 6a in place of the coil 6b. As a result, the pulse motor 6 rotates clockwise by one step.

Furthermore, the character 1 is fed to the decoder circuit 51, the counter 51G feeds pulse signal 51g to the driving circuit 52 again. Upon receiving this pulse signal, the output signal of the flip-flop 52A is inverted again while the output signal of the flip-flop 52D is inverted to excite the coil 6c in place of the coil 6d. As a result, the pulse motor 6 rotates clockwise by one step further.

At last, the character 1 is fed to the decoder circuit 51. The output signals of the flip flops 52A, 52B are inverted to excite the coil 6b in place of the coil 6a. As a result, the pulse motor 6 rotates clockwise by one step, furthermore.

In order to rotate the pulse motor 6 counterclockwise, the character signals composed of the character 3 and a plurality of the character 1 of which the number corresponds to the number of rotation steps, are fed from the computer 4 as the rotation directing signal 4a.

In order to rotate the pulse motor 7 clockwise, the character signal composed of the character 5 and a plurality of the character 4 of which the number corresponds to the number of rotation steps, is fed from the computer 4 as the rotation directing signal 4a. In order to rotate the pulse motor 7 counterclockwise, the character signal composed of the character 6 and a plurality of the character 4 of which the number corresponds to the number of rotation steps, is fed from the computer 4 as the rotation directing signal 4a.

When the sound source is searched by the device of the present invention, at first the amplifier level, the frequency of the sound source to be searched, and the number of searching steps in the horizontal and vertical directions are set in the computer 4. Next the microphones 11a, 11b are horizontally positioned by means of the pulse motor 7 so that the indicator 9 points in the vertical direction.

Figure 1:
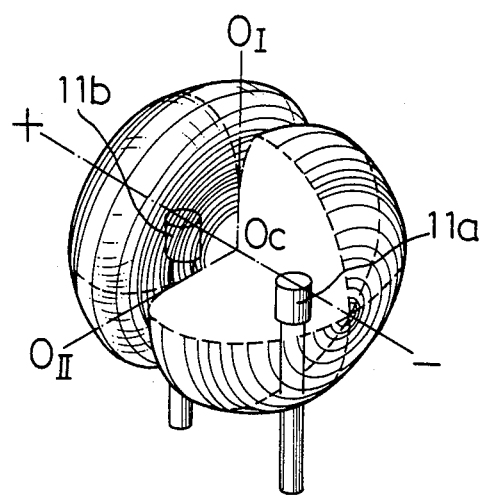
FIG. 1 is a view illustrating directional characteristics of an intensity probe.

In the above embodiment, the directional characteristics of the intensity probe 1 on the plane including $O_I$, +, − as shown in FIG. 1 is applied to the search on the horizontal plane while the directional characteristic on the plane including $O_{II}$, +, − is applied to the search on the vertical plane. The indicator 9 is positioned on the line connecting the points Oc and $O_{II}$. In the sound source searching device of the present invention, at first the intensity probe 1 is rotated on the horizontal plane about the middle point Oc in steps by means of the pulse motor 6. The intensity value at each step is successively calculated by means of the computer 4. Next, the intensity probe 1 is returned to the step where the absolute value of intensity is the minimum on the horizontal plane. Then, the intensity probe is rotated by 90° so that the plane including $O_{II}$, +, − shown in FIG. 1 coincides with the vertical plane. The intensity probe 1 is rotated on the vertical plane about the middle point Oc in steps by means of the pulse motor 7. The intensity value at each step is successively calculated by means of the computer 4. The intensity probe 1 returns to the step where the absolute value of intensity is the minimum on the vertical plane. At this time, the indicator 9 indicates the direction of sound source.

Instead of the directional characteristics on the planes used in the above embodiment, the directional characteristics on other planes, can be used.

As described above, according to the sound source searching device of the present invention, the sound source can be searched automatically by rotating the intensity probe on arbitrary selected planes which are perpendicular to each other by means of the driving means in accordance with the instructions of the processing means. Therefore, the sound source can be precisely and speedily searched.

What is claimed is:

1. A sound source searching device for searching an objective sound source comprising:
    an intensity probe provided with one pair of microphones;
    a probe driving means for supporting said intensity probe and rotating said intensity probe stepwise in a first plane and in a second plane which perpendicularly intersects the first plane about a middle point of said microphones by a predetermined angle;
    a frequency analyzing means for analyzing the frequency of the sound pressure signals fed from said intensity probe at every rotating step and forming a cross spectrum of sound pressure signals;
    a processing means for calculating acoustic intensity corresponding to the frequency of the objective sound source from the cross spectrum; and
    a direction indicating means for indicating the direction in which the absolute value of acoustic intensity is the minimum in the second plane including the direction in which the absolute value of acoustic intensity is the minimum in the first plane.

2. A sound source searching device according to claim 1, wherein:
    said first plane is the horizontal plane; and
    said second plane is the vertical plane.

3. A sound source searching device according to claim 1, wherein:
    said probe driving means comprises a first and a second pulse motor, each of which rotates stepwise by a predetermined angle upon receiving pulse signals.

4. A sound source searching device according to claim 1, wherein:
    said direction indicating means is an indicator which is integrally fixed to said intensity probe so as to extend in the direction perpendicular to a line connecting said microphones and pass through the middle point of said line.

5. A sound source searching device according to claim 2, wherein:
    said probe driving means comprises:
        a supporting member for supporting said intensity probe; said supporting member being provided with a horizontally extending horizontal portion and a vertically extending vertical portion which is integrally connected to said horizontal portion;
        a first motor of which the rotating shaft supports said horizontal portion in the vertical direction and rotates said horizontal portion in the horizontal direction; and
        a second motor of which the rotating shaft is rotatably supported by said vertical portion in the horizontal direction and supports said intensity probe; a middle point between said microphones being positioned at a intersection of the extensions of said rotating shafts of said first and second motors.

6. A sound source searching device according to claim 3, wherein:
    said processing means comprises a computer;
    said probe driving means further comprises an interface circuit which converts serial signals fed from said computer as motor driving signals, into parallel signals and decodes the parallel signals into pulse signals to be fed to said first and said second pulse motors.

7. A sound source searching device according to claim 6, wherein:
    said serial signals are serial character signals expressed by ASCII code.

* * * * *